July 20, 1926.
M. B. SAMPLE
1,592,962
DIGGER ATTACHMENT FOR TRACTORS
Filed Nov. 7, 1925
2 Sheets-Sheet 1
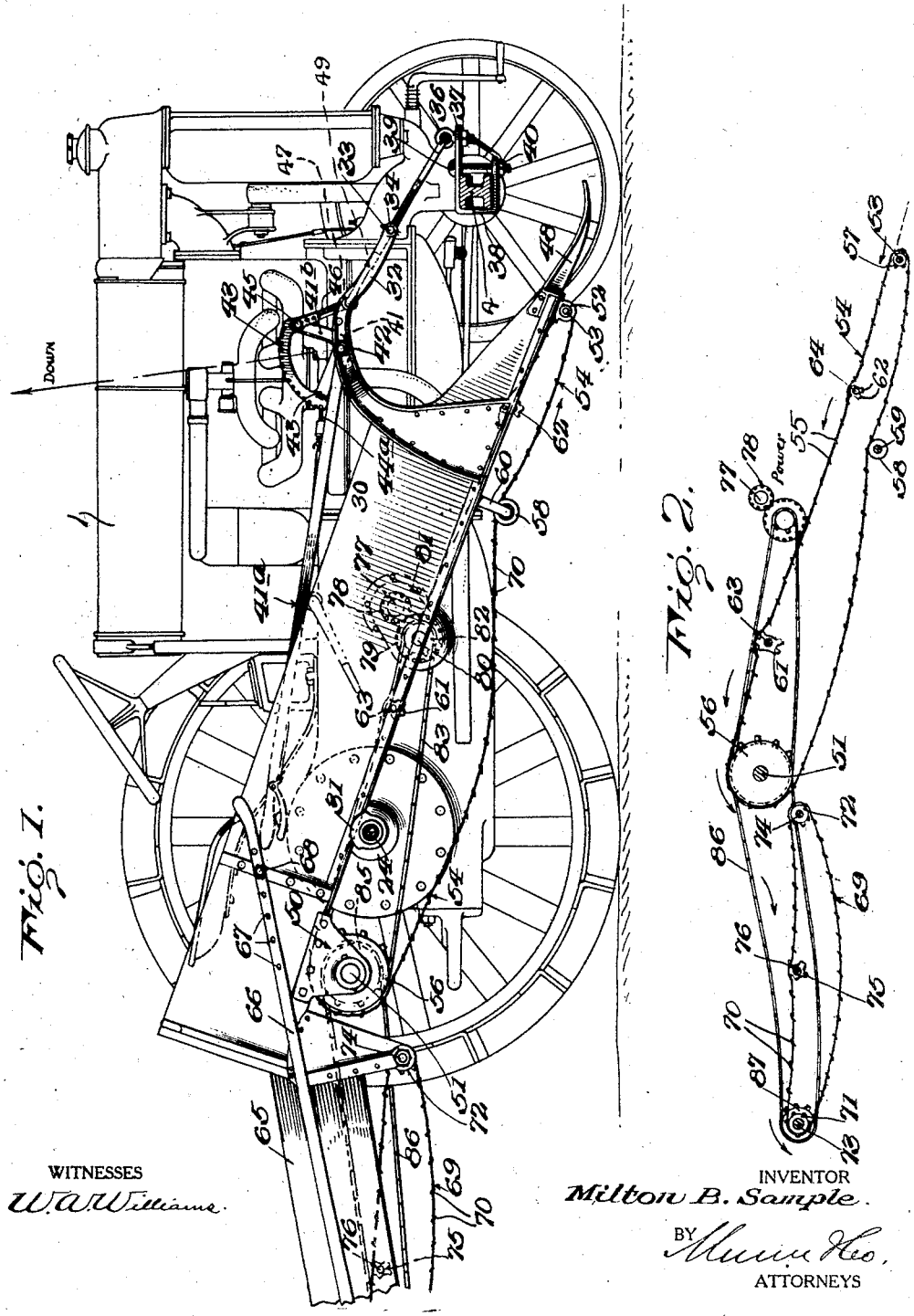
WITNESSES
INVENTOR
Milton B. Sample
BY
ATTORNEYS July 20, 1926.
M. B. SAMPLE
1,592,962
DIGGER ATTACHMENT FOR TRACTORS
Filed Nov. 7, 1925   2 Sheets-Sheet 2
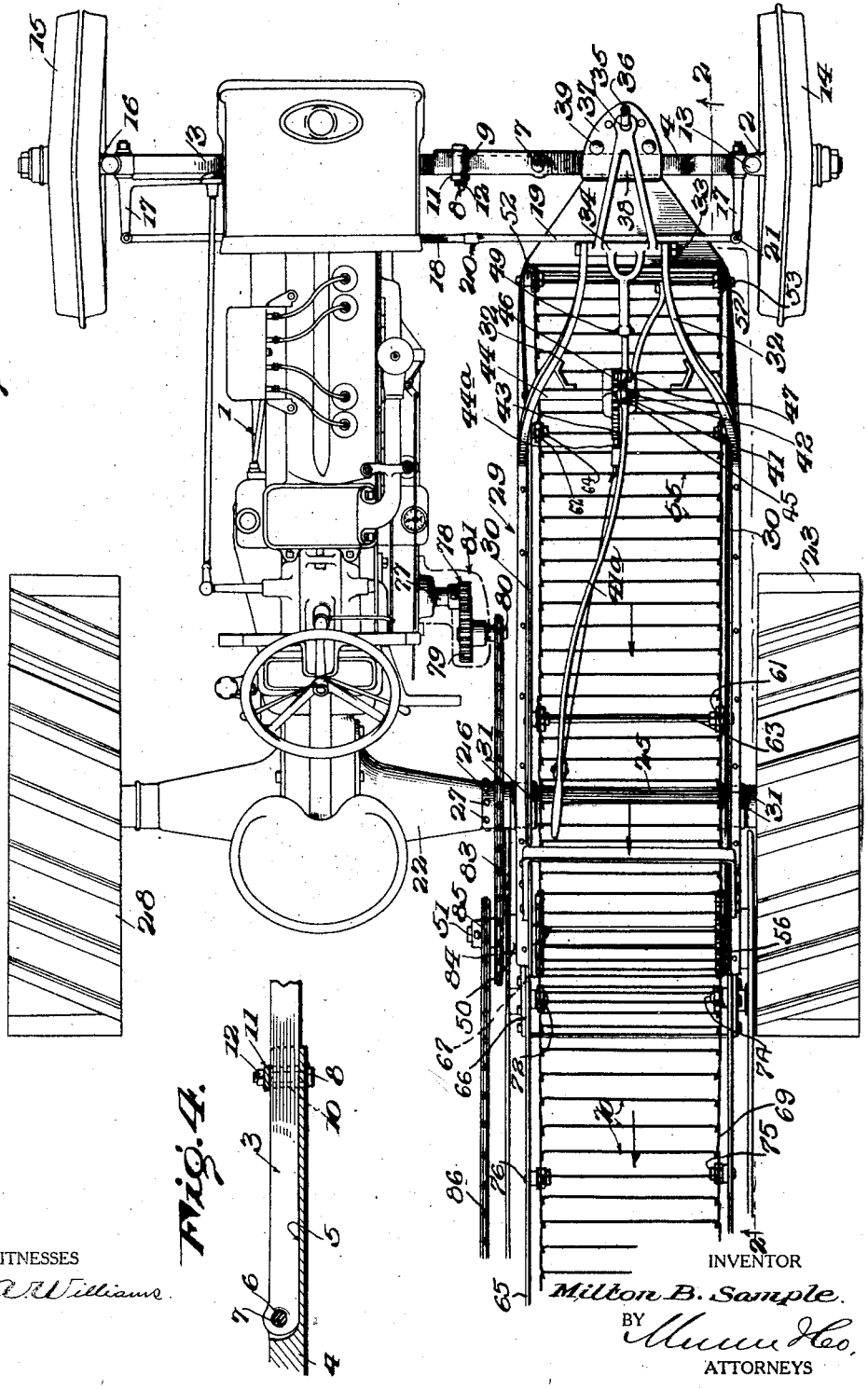
WITNESSES
INVENTOR
Milton B. Sample.
BY
ATTORNEYS Patented July 20, 1926.

1,592,962

UNITED STATES PATENT OFFICE.

MILTON B. SAMPLE, OF ELIZABETH CITY, NORTH CAROLINA.

DIGGER ATTACHMENT FOR TRACTORS.

Application filed November 7, 1925. Serial No. 67,662.

My invention relates to improvements in digger attachments for tractors, and it consists in the combinations, constructions and arrangements herein described and claimed.

An object of the invention is the provision of an attachment for a tractor of a well known type of construction which will afford facilities for supporting one front wheel of the tractor and the corresponding rear wheel of the tractor in line with each other at a considerably greater distance from the body of the tractor than is usual and for supporting a digger construction between the body of the tractor and the plane of said one front wheel and the corresponding rear wheel of the tractor, whereby the tractor with the attachment thereon can be driven in straddling relation to two adjacent rows of potatoes, peanuts or the like and the digger mechanism can be employed to dig potatoes, peanuts or the like from the earth and to deliver the potatoes, peanuts or the like at the rear of the attachment.

A further object of the invention is the provision in an attachment of the character described of means for transmitting power from the usual power take-off shaft of the tractor to an operating part of the digger mechanism.

Other objects and advantages of the invention will be apparent from the following description, taken in conjunction with the accompanying drawings, in which—

Figure 1 is a longitudinal vertical section through the attachment, showing in side elevation the tractor to which the attachment has been applied, the section being taken substantially along the line 2—2 of Figure 3.

Figure 2 is a view, partly in vertical section and partly in elevation, showing the power transmitting and conveyor means of the attachment, Figure 3 is a plan view of the tractor and of the digger attachment which has been applied to the tractor, Figure 4 is a fragmentary horizontal sectional view showing cooperative portions of the front axle of the tractor and of the axle extension which is comprised in the attachment and is connected with the front axle.

An attachment embodying the invention is adapted to be applied to a tractor of a well known type of construction, such as shown at 1 in Figures 1 and 3 of the drawings.

In carrying out the invention, one front wheel spindle 2 is detached from the front axle 3 of the tractor and a section 4 is inserted in the front axle of the tractor between the usual front axle 3 and the wheel spindle 2. As illustrated to advantage in Figure 4, this inserted section 4 of the axle is recessed from its rearward side for part of its length from the inner end thereof as indicated at 5, to receive the adjacent end portion of the usual front axle 3 of the tractor. The top and bottom walls of the recessed portion of the added section 4 are formed with vertically aligned openings in register with the vertical opening 6 in the adjacent end portion of the axle 3 and a vertical fastening pin 7 is projected through these aligned openings in the front axle 3 of the tractor and the added section 4. The added section 4 is additionally secured to the usual front axle 3 of the tractor by means of horizontal bolts 8 which extend through transverse bosses such as indicated at 9 in Figure 3 and at 10 in Figure 4, the boss 9 being on the upper side of the added section 4 and the boss 10 being on the lower side of the added section 4. The end portions of the bolts 8 extend through openings in a clamping plate 11 and are engaged by nuts 12 whereby the extreme inner end portion of the added section 4 will be clamped to the usual front axle 3 of the tractor. The outer end portion of the added section 4 is adapted to be connected by means of the usual vertical pivot pin 13 with the front wheel spindle 2. The front wheel spindle 2 carries one of the front wheels of the tractor, indicated at 14, the other front wheel of the tractor being indicated at 15 and being carried by the other front wheel spindle of the tractor. The second front wheel spindle of the tractor is indicated at 16. The spindle arms 17 for actuating the front wheel spindles 2 and 16 are connected by a connecting rod which comprises the usual connecting rod 18 of the tractor steering mechanism and an extension 19 which is connected at one end, as at 20, to the adjacent end of the tractor connecting rod 18 and is connected at its other end, as at 21, to the arm 17 for the front wheel spindle 2.

The usual rear axle housing of the tractor is indicated at 22. In carrying out the invention, the rear wheel 23 of the tractor and the usual section of the rear axle of the tractor at the side of the tractor to which the section 4 has been applied to the front axle of the tractor are removed. The section of the rear axle of the tractor that has been removed is replaced by an axle section 24 and is of sufficient length to extend laterally of the body of the tractor a distance sufficient to support the rear wheel 23 in position to track with the front wheel 14.

The portion of the substitute rear axle section that protrudes from the usual rear axle housing 22 extends through a tubular extension 25 to said rear axle housing, said tubular extension having an enlarged inner end portion 26 fitting over the adjacent end of the rear axle housing 22 and rigidly secured to the rear axle housing 22, as by means of rivets 27 or like fastening devices.

The second rear wheel of the tractor is indicated at 28 and is supported in the usual manner at the opposite end of the rear axle housing 22. The arrangement is such that the wheels at opposite sides of the tractor are adapted to straddle two rows of potatoes, peanuts or the like when said rows are spaced the usual distance apart.

The laterally extending front axle section 4 and the laterally extending section 25 of the rear axle housing are adapted to support digger mechanism as indicated at 29 which may be of any suitable known type of construction. The specific digger mechanism illustrated in the drawings includes a frame which includes a pair of connected together spaced side members 30 which are rockingly supported adjacent to their rearward ends on the extension 25 of the rear axle housing between upstanding integral transverse lugs or ribs 31 on the extension 25 to the rear axle housing of the tractor. The frame of the digger mechanism thus is held against slipping laterally on the extension 25 to the rear axle housing of the tractor. The sides of the frame of the digger mechanism have the forward portions thereof connected rigidly with a pair of attaching bars 32 which curve inwardly and upwardly and then forwardly as shown in Figure 1. The forward end portions of the bars 32 carry a transverse rod 33 on which the supporting member 34 is pivotally mounted intermediate the length of said supporting member. The supporting member 34 has the front end portion thereof fashioned to provide a vertical eye 35 which is engaged with an eyebolt 36. The eyebolt 36 is carried by the forwardly extending edge portion of the upper member of a substantially U-shaped clamping plate 38 which embraces the extension 4 of the front axle and is retained on the latter by vertical bolts 39 and nuts 40.

A bell crank lever 41 is fulcrumed on a horizontal stub shaft or pivot element 42, which is carried by a sector plate 43 and extends laterally of the sector plate. The sector plate 43 is supported on a bar 44 which extends transversely between the members 32 adjacent to the rearward ends of the latter. The bell-crank includes a relatively long handle portion 41ª and a forked shorter arm 41ᵇ which is connected by a horizontal pivot element 45 to the rearward end of a link 46 which is pivotally connected at 47 to the rearward end of the member 34. The handle portion 41ª of the bell-crank carries a spring pressed latch 44ª which engages with teeth in the convexly curved upper edge of the sector plate. When the handle portion of the bell-crank has been swung downwardly and rearwardly as shown in Figures 1 and 3, the front arm 41ᵇ of the bell-crank will have been raised and the member 34 likewise will have been swung upwardly about the pivotal connection between the front end of the member 34 and the eye-bolt 36 and the front end of the frame of the digger mechanism will have been raised so that the digger blade 48 will be supported above the surface of the earth, as clearly shown. However, when the arm 41ª of the lever has been swung forwardly from the position shown in Figures 1 and 3, the forward end of the frame of the digger mechanism will be permitted to move downwardly, the frame of the digger mechanism rocks about the axis of the rear axle extension 24 and the blade 45 of the digger mechanism will enter the earth. The depth to which the blade will penetrate into the earth can be adjusted by varying the position of the arm 41ª of the operating lever along the sector plate. The member 34 thus may be termed an actuating lever and it will be noted by referring to Figure 3 that the rearward end portion of this actuating lever is adjustable as to length, being formed of two telescopic sections adjustably connected at 49.

Brackets, as at 50, depend from the lower end portions of the sides of the frame of the digger mechanism and support a rotatable transverse shaft 51. Other brackets 52 depend from the forward end portions of the sides of the frame of the digger mechanism and support a transverse shaft 53. An endless conveyor generally designated 54 in Figure 2 comprises a series of spaced cross rods 55 having their ends connected to form eyelets which engage with sprocket wheels 56 and 57, respectively, which are carried by the shafts 51 and 53, respectively. The conveyor 54 has the lower stretch thereof supported intermediate its length on a roller 58 which is rotatably supported by a shaft 59 having upturned end portions, as at 60, secured to the sides of the frame of the digger mechanism intermediate the length of the latter. The upper stretch of the conveyor 54 passes over irregularly shaped rotary agitator elements 61 and 62, respectively, which are carried by spaced transverse shafts 63 and 64, respectively, which extend between the sides of the frame of the digger mechanism.

A delivery mechanism at the rear of the digger mechanism has a frame comprising a pair of spaced side members 65 which are adjustably connected by the bars 66 having the spaced openings 67 therein, and the bolts and nuts indicated at 68, to the sides of the frame of the digger mechanism. The conveyor 54 discharges onto an endless discharge conveyor 69 which is constructed in the same manner as the conveyor 54 and comprises an endless series of joined together transverse rods 70 having their ends connected to form eyelets for engaging with the teeth of sprocket wheels 71 and 72, respectively. The sprocket wheels 71 are carried by a transverse shaft 73 which is rotatably supported by the side members 65 of the delivery mechanism adjacent to the rearward end of the latter and the sprockets 72 are carried by a transverse shaft 74 which extends between the sides 65 of the delivery mechanism of the device underneath the rearward end of the conveyor 54. Irregularly shaped rotary agitator members 75 support the upper stretch of the conveyor 69 and are carried by a cross rod 76 which extends between the side members of the frame of the delivery mechanism. The usual cap (not shown) that covers the end of the usual power take-off shaft 77 of the tractor is removed, as is the usual pulley, also not shown, on the power take-off shaft. The pulley is replaced by a relatively small drive gear 78 which is in mesh with a larger gear 79 on a second motion shaft 80. The shaft 80 is journalled in a bearing that is carried by a cap 81 which is secured to the body of the tractor and which houses the gears 78 and 79 and partially houses the shaft 80. However, the latter extends from the housing 81 and carries a sprocket 82 connected by a chain 83 with a sprocket 84 on the shaft 51. A second sprocket 85 is connected by a chain 86 with a sprocket 87 on the shaft 73.

From the foregoing description of the various parts of the device, the operation thereof may be readily understood. The conveyors 54 and 69 will be driven by power that is derived from the power take-off shaft 77 of the tractor when the construction described in the foregoing is employed. The wheels on opposite sides of the tractor straddle a row or rows of potatoes, peanuts, or the like and the digger mechanism can be adjusted in the manner described so that the blade 48 will penetrate the earth and the potatoes, peanuts or the like will be delivered onto the forward end portion of the upper stretch of the endless conveyor 54. Most of the earth will drop through the spaces between the cross rods of the conveyor and the agitator members 61 and 62 will agitate the upper stretch of the conveyor 54 so that any earth that might otherwise adhere to the potatoes, peanuts or the like will be loosened therefrom. The potatoes, peanuts or the like are delivered to the delivery conveyor 69 and thence at the rear of the device to any suitable receptacle, none being shown. The agitator 75 will oscillate or agitate the upper stretch of the conveyor 69 so as to further clean the potatoes, peanuts or the like.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. The combination with a tractor having the front and rear axle assemblies extended laterally of the body of the tractor at one side of the latter, and a digger mechanism adjustably supported by the laterally extending portions of the axle assemblies.

2. The combination with a tractor having the front and rear axle assemblies extended laterally of the body of the tractor at one side of the latter, and a digger mechanism adjustably supported by the laterally extending portions of the axle assemblies, said digger mechanism including a movably supported endless conveyor, and motion transmitting means for transmitting power from the power take-off shaft of the tractor to said conveyor.

3. In combination, a tractor having a rigid section inserted in the front axle between one front wheel spindle and the usual front axle, said added front axle section extending at one side of the body of the tractor, and said tractor having a tubular extension to the rear axle housing at the same side of the tractor as the added section of the front axle of the housing, said tractor having a rear axle section extending through said extension to the rear axle housing and having a rear wheel on said rear axle section, a digger mechanism comprising a frame rockingly supported on the extension of the rear axle housing, said frame having a digging blade at its front end, and means adjustably connecting the front end portion of said frame and the added section of the front axle.

4. In combination, a tractor having a rigid section inserted in the front axle between one front wheel spindle and the usual front axle, said added front, axle section extending at one side of the body of the tractor, and said tractor having a tubular extension to the rear axle housing at the same side of the tractor as the added section of the front axle of the housing, said tractor having a rear axle section extending through said extension to the rear axle housing and having a rear wheel at the outer end of the extension, a digger mechanism comprising a frame rockingly supported on the extension of the rear axle housing, said frame having a digging blade at its front end, means adjustably connecting the front end portion of said frame and the added section of the front axle, and means for actuating said adjustable connecting means to raise and lower the front end of the digger mechanism and the blade thereon at will.

5. In combination, a tractor having a rigid section inserted in the front axle between one front wheel spindle and the usual front axle, said added front axle section extending at one side of the body of the tractor, and said tractor having a tubular extension to the rear axle housing at the same side of the tractor as the added section of the front axle of the housing, said tractor having a rear axle section extending through said extension to the rear axle housing and having a rear wheel on said rear axle section, a digger mechanism comprising a frame rockingly supported on the extension of the rear axle housing, said frame having a digging blade at its front end, means adjustably connecting the front end portion of said frame and the added section of the front axle, means for actuating said adjustable connecting means to raise and lower the front end of the digger mechanism and the blade thereon at will, said digger mechanism comprising a movably supported endless conveyor for transferring matter from the blade of the digger rearwardly, and means for driving said conveyor, including a motion transmitting connection with the power take-off shaft of the tractor.

6. In combination, a tractor having a rigid section inserted in the front axle between one front wheel spindle and the usual front axle, said added front axle section extending at one side of the body of the tractor, and said tractor having a tubular extension to the rear axle housing at the same side of the tractor as the added section of the front axle of the housing, said tractor having a rear axle section extending through said extension to the rear axle housing and having a rear wheel at the outer end of the extension, a digger mechanism comprising a frame rockingly supported on the extension of the rear axle housing, said frame having a digging blade at its front end, means adjustably connecting the front end portion of said frame and the added section of the front axle, and means for actuating said adjustable connecting means to raise and lower the front end of the digger mechanism and the blade thereon at will, said digger mechanism comprising a movably supported endless conveyor for transferring matter from the blade of the digger rearwardly, means for driving said conveyor, including a motion transmitting connection with the power take-off shaft of the tractor, a delivery mechanism comprising a frame attached to the frame of the digger mechanism and disposed rearwardly of the latter, an endless delivery conveyor carried by the frame of the delivery mechanism, means actuated by said first named driving means for driving said delivery conveyor, and rotary irregularly shaped agitator members partially supporting the upper stretches of the conveyors and oscillating said upper stretches of the conveyors vertically.

7. An attachment of the character described comprising a rigid section recessed laterally for part of its length from its inner end to receive an end portion of the front axle of a tractor after one front wheel spindle has been removed from said front axle, said added section having a vertical opening extending through the top and bottom members of the recessed portion thereof in line with the usual vertical openings in the extremity of the front axle of the tractor at the adjacent end of the latter, a vertical pivot element extending through said aligned openings in the front axle of the tractor and in said added section, and clamping means securing the inner end portion of the added section to said front axle of the tractor, said added section being adapted at its outer end for connection with said one front wheel spindle of the ractor.

8. An attachment of the character described comprising a rigid section recessed laterally for part of its length from its inner end to receive an end portion of the front axle of a tractor after one front wheel spindle has been removed from said front axle, said added section having a vertical opening extending through the top and bottom members of the recessed portion thereof in line with the usual vertical openings in the extremity of the front axle of the tractor at the adjacent end of the latter, a vertical pivot element extending through said aligned openings in the front axle of the tractor and in said added section, clamping means securing the inner end portion of the added section to said front axle of the tractor, said added section being adapted at its outer end for connection with said one front wheel spindle of the tractor, a rear axle housing having a tubular extension at the same side of the tractor as the added section in the front axle assembly, a rear axle section extending through said extension and being adapted to support said one rear wheel in line with the corresponding front wheel of the tractor, and a digger mechanism rockingly supported on said extension to the rear axle housing and adjustably connected to the added section of the front axle assembly.

MILTON B. SAMPLE.